United States Patent [19]

Barrington

[11] 4,311,297
[45] Jan. 19, 1982

[54] PRESSURE INSENSITIVE VALVE
[75] Inventor: Claud C. Barrington, Houston, Tex.
[73] Assignee: Exxon Production Research Company, Houston, Tex.
[21] Appl. No.: 137,187
[22] Filed: Apr. 4, 1980
[51] Int. Cl.³ ............................................ F16K 31/126
[52] U.S. Cl. ................................ 251/63.6; 137/236 S; 166/324; 166/363
[58] Field of Search ................ 137/315, 236 R, 236 S, 137/454.2, 454.5, 454.6, 629; 251/62, 63, 63.5, 63.6, 282, 327, 328, 329; 166/324, 363, 72

[56] References Cited
U.S. PATENT DOCUMENTS

| | | | |
|---|---|---|---|
| Re. 30,115 | 10/1979 | Herd et al. | 251/63.6 |
| 3,331,583 | 7/1967 | Baker | 251/63.5 |
| 4,029,294 | 6/1977 | McCaskill et al. | 251/282 |
| 4,230,299 | 10/1980 | Pierce, Jr. | 251/63.6 |

OTHER PUBLICATIONS

"Composite Catalog of Oil Field Equipment and Services", by World Oil, 1976–1977 Edition, pp. 4956 and 4957.
Herd et al., Offshore, Aug. 1979, Fail-safe Valves Take on New Demands, pp. 137–140.

Primary Examiner—George L. Walton
Attorney, Agent, or Firm—Marc L. Delflache

[57] ABSTRACT

A pressure insensitive, fail-safe subsea valve is disclosed. The valve is manipulator operable for deep water application and does not require conventional diving techniques to install, maintain or remove. The valve is pressure balanced by employing a hollow valve stem which equalizes the pressure on both ends of the stem.

9 Claims, 4 Drawing Figures

PRESSURE INSENSITIVE VALVE

BACKGROUND OF THE INVENTION

1. Field of the Invention

This invention relates to a subsea valve apparatus to control the flow of fluid in a pipe. More particularly, this invention relates to a subsea valve that is insensitive to ambient hydrostatic pressure and automatically closes to stop fluid flow in a pipe when a loss of hydraulic operating pressure occurs.

2. Description of the Prior Art

As the production of oil and gas expands to deeper water depths, the use of fixed offshore structures which extend from the sea floor to above the water surface eventually becomes economically infeasible. One of the more practicable alternatives is the use of a subsea production system (see U.S. Pat. No. 3,777,812). However, in deep water environments it is essential that all the valves on a subsea production system used to control the flow of oil and gas be insensitive to the ambient hydrostatic pressures. That is, the operation of the valve under all conditions should not be affected by the local water pressure. In addition, it is important that these valves be fail-safe. If the hydraulic or pneumatic operating pressure fails, the valve should automatically close the pipe or pipeline to prevent further fluid flow.

Pressure insensitive (sometimes referred to as "balanced"), fail-safe valves which close or shut off the flow of fluid in pipelines during the loss of hydraulic operating pressures or the like are known in the art (see, for example, U.S. Pat. No. Re. 30,115). Such underwater valves generally include a piston-operated valve stem which reciprocates within a cylinder to open and close a gate. In a single acting valve, hydraulic pressure or power fluid forces the piston in one direction, commonly referred to as a power stroke, and a spring means returns the piston to its starting position, commonly referred to as an exhaust stroke. In the event the hydrostatic pressure acting on the exposed end of the piston (the difference between the operating pressure and the valve pressure multiplied by the piston stem diameter) is greater than the spring load in the piston operator, the valve will remain in the open position. If an opposing valve stem capable of contacting the valve element is added as illustrated in Reissue 30,115, the unwanted hydrostatic force exerted against the stem is balanced thereby permitting the spring to close the valve even when the ambient pressure is greater than the internal valve pressure. Reissue 30,115 discloses a balanced stem, fail-safe valve system which includes a balancing stem detached from the main valve element but engagable with it, thereby permitting the stem to balance the valve when the hydrostatic pressure is greater than the internal pressure. However, since the stem is detached, the valve operates as a conventional fail-safe valve when the ambient hydrostatic pressure is less than the internal operating pressure.

While fail-safe, pressure insensitive valves such as that disclosed in Reissue 30,115 are available, a need exists for a remotely operable, fail-safe, pressure insensitive valve which can be quickly attached and detached from a pipeline with a subsea manipulator tool or the like. This need is accentuated as oil and gas is produced in deeper water depths requiring the use of subsea valves which are not readily installed, maintained or removed by conventional diving techniques.

SUMMARY OF THE INVENTION

The present invention substantially satisfies the needs discussed above by providing a remotely operable, pressure insensitive valve that is capable of being attached and detached from a submerged pipeline by a manipulator tool and that will close the pipeline when the operating pressure is lost.

Briefly, the valve of the present invention comprises closure means for movement across the pipeline and reciprocating means to move the closure means across the pipeline. The closure means includes a valve element or gate for sealing off the pipeline and a valve stem extending outwardly from the element. The valve also includes means for encasing the valve in a waterproof manner to protect it from the ambient hydrostatic pressure.

More specifically, the valve comprises a housing that engages a receiving or mounting hub of the submerged pipeline and a valve body securably attached to the housing. Internally, the valve is partitioned into at least two end chambers, one within the valve body and a second within the housing at the opposite end of the housing from the valve body. A valve element is supported within the chamber of the valve body. A valve stem is attached to the valve element and extends longitudinally through the housing into the chamber of the housing. The valve stem is hollow thereby permitting fluid communication between the two chambers. In this manner, the pressure in each chamber is equalized and the forces against each end of the valve stem is substantially the same.

As mentioned above, the valve includes a reciprocating or biasing means located within an intermediate chamber between the two end chambers. Preferably, the reciprocating means comprises an annular piston positioned around the valve stem and compression springs positioned around the valve stem within the intermediate chamber. The spring means is positioned so as to longitudinally displace the valve element across the pipeline during a loss of the operating pressure. This provides for a fail-safe mechanism to shut the pipeline off.

Preferably, the reciprocating means also includes pressure means to operably displace the piston longitudinally within the housing in opposition to the force of the compression springs. In this manner, the pressure means and compression springs work in a counterbalancing manner to displace the piston and, therefore, the valve element in a reciprocating manner which thereby opens and closes the pipeline.

Examples of the more important features of this invention have been summarized rather broadly in order that the detailed description which follows may be better understod. There are, of course, additional features of the invention which will be described hereafter and which will also form the subject of the claims appended hereto.

BRIEF DESCRIPTION OF THE DRAWINGS

In order to more fully understand the drawings used in the detailed description of the present invention, a brief description of each drawing is provided.

FIG. 4 also schematically illustrates the hydraulic components that may be used to operate the valve.

DETAILED DESCRIPTION OF THE PREFERRED EMBODIMENT

Figure 1:
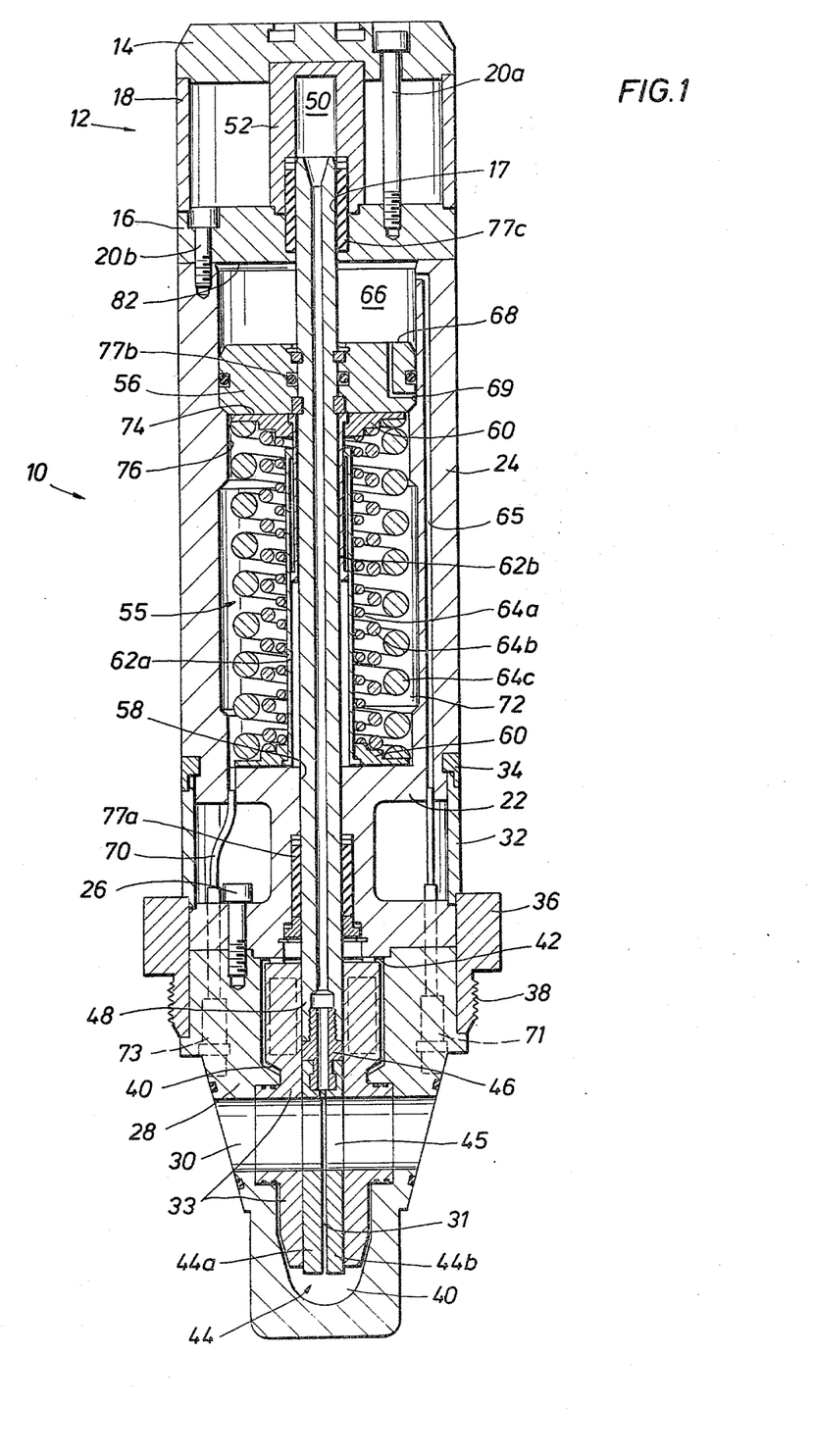
FIG. 1 is a sectional view of a valve of the present invention wherein the valve is in the open position to permit fluid flow through the pipeline.

FIG. 1 illustrates a valve of the present invention which comprises a housing 10, an actuator end 12 and a valve body 28. The actuator end includes an upper cap 14, a lower cap 16 and a sleeve element 18 therebetween. The upper and lower caps 14 and 16 are held together by screws 20a. The lower cap 16 is secured to the housing 10 by screws 20b (only one of each of the screws 20a and 20b are illustrated in FIG. 1; however, several such screws would be located peripherally about each cap 14 and 16). The housing 10 includes a valve bonnet 22 and a hollow cylindrical member 24 which are preferably integral components. The valve bonnet 22 is attached to the valve body 28 by screws 26 (only one screw 26 is shown in FIG. 1).

The valve of FIG. 1 also includes a lower sleeve 32 which provides a continuously flush outer lower surface for the valve. The lower sleeve is held in place along one edge by a retainer ring 34 and along the other edge by a locking ring 36. The ring 36, which is rotatable with respect to the valve bonnet 22 and body 28, includes threads 38 thereby permitting the engagement of the valve with a mounting hub on the pipeline (see FIG. 4).

Referring still to FIG. 1, the valve body 28 has a cylindrical passageway 30 which forms part of a first chamber 40. The chamber 40 also includes all fluid space within the valve body up to a front face 42 of the bonnet 22. For purposes herein, the term "chamber" means an open region which may vary in size depending on the movement of the internal components of the valve.

The valve includes a valve element 44 having an aperture 45 to open and close the passageway 30. Preferably, the valve element 44 is made up of two gates 44a and 44b separated by a fluid gap 31. A bifurcated gate system is preferred because when the passageway 30 is closed (see FIG. 2), the high pipeline pressure on one side of the valve body will affect only the downstream gate. The other gate on the high pressure side of the pipeline will usually be substantially friction-free. The operation of a bifurcated gate system is discussed in greater detail below. For purposes of the operation of the valve, the valve element 44 does not need to be bifurcated. Indeed, a single gate having a single aperture for alignment with the passageway 30 is sufficient.

The valve also includes a self-sealing system 33. The self-sealing system 33 ensures that a fluid-tight seal exists between the valve body 28 and the valve element 44. An example of a suitable self-sealing system is that manufactured by the McEvoy Oil Field Equipment Company and described at page 4608 of volume 3 of the *Composite Catolog of Oil Field Equipment and Services* by World Oil, 1978–79 edition.

The valve element 44 is supported within the first chamber 40 by lifting lugs 46. The lifting lugs (such as that manufactured by McEvoy and illustrated in valve Model C described at page 4610 of volume 3 of the *Composite Catalog of Oil Field Equipment and Services* by World Oil, 1978–79 edition) are connected to a valve stem 48. The valve stem extends from the first chamber 40, through an aperture 58 of the bonnet 22, an aperture 17 of the lower cap 16 and into a second chamber 50 at the other end of the valve. The second chamber 50 is formed by a pressure cap 52 secured between the upper and lower caps 14 and 16.

The valve stem 48 includes a hollow passageway 54 which extends throughout its entire length. The passageway 54 provides fluid communication between the first chamber 40 and the second chamber 50. In this manner, the pressure acting against the end of the valve stem 48 in the first chamber 40 is substantially the same as the pressure against the other end of the valve stem 48 in the second chamber 50. The valve stem 48 does not need to be a separate component from the valve element 44 and the lifting lugs 46 for purposes of this invention. The stem, lifting lugs and element (or gate) may be an integral component.

When a bifurcated gate system is used, as previously discussed, compression springs are located between the gates 44a and 44b to maintain the gates against the sides of the sealing system 33. Compression springs are not shown in FIGS. 1–4, but they are illustrated on the gates of valve Model C at page 4610 of volume 3 of the *Composite Catalog* and discussed in note 13 at page 4611 of volume 3 of the *Composite Catalog*. When the passageway 30 is closed by the gates 44a and 44b (see FIG. 2), one side of the passageway 30 will have a higher pipeline pressure than the other side. The compression forces of the springs between the gates are chosen so that the gate immediately adjacent the high pressure side of the passageway 30 is displaced slightly. This permits the high pressure to enter the first chamber 40, passageway 54 and second chamber 50. However, the sealing system prevents the high pressure from leaking past the other gate into the low pressure side of the passageway 30 (see discussion of the sealing system at page 4608 of volume 3 of the *Composite Catalog*).

The valve also includes a reciprocating system 55 for operably moving the valve stem 48 and, therefore, the valve element 44 across the passageway 30. The reciprocating system is within a third or intermediate chamber located within the cylindrical member 24 and between the lower cap 16 and the valve bonnet 22.

The reciprocating system includes an annular piston 56, attached to the valve stem 48, and a spring cartridge. The spring cartridge comprises two mounting heads 60, inter-connected by two sliding sleeves 62a–b, and three concentric helical springs 64a–c mounted in compression between the heads 60. Thus, the piston 56 is biased outwardly with respect to the valve body 28. The sleeves 62a–b prevent the full extension of the springs 64a–c when the screws 20a and 20b and the caps 14 and 16 are removed. Due to the springs cartridge, the springs can be maintained in a pre-stressed condition for ease of assembly and disassembly.

Referring still to FIG. 1, the valve further includes a conduit 65 which extends from a first compartment 66 of the intermediate chamber, through the wall of the cylindrical member 24, the valve bonnet 22 and into the valve body 28. The first compartment 66 varies in size and is defined to be between a first face 68 of the piston and the lower cap 16. The conduit 65 terminates into a quick-disconnector 71 such as model MJC69307-12 manufactured by the Aeroquip Corporation of Jackson, Mich.

The valve also includes a second conduit 70 which extends from a second compartment 72 of the intermediate chamber (the second compartment 72 also varies in size and is defined to be beteen a second face 74 of the piston and the valve bonnet 22), through the valve bonnet 22 and valve body 28 into a quick-disconnector 73 similar to quick-disconnector 71. For reasons of clarity, the conduits 65 and 70 and quick-disconnectors 71 and 73 are shown 90° out of phase in FIGS. 1, 2 and 4. Actually, these conduits are quick-disconnectors are aligned co-axially with the valve system 48 so that the conduits need not include a U-shaped section to pass around the passageway 30.

Preferably, the valve also includes pressure seals 77a–c to maintain the pressure integrity of the chambers 40 and 50 and the compartments 66 and 72. The seals 77a–c are used to prevent leaks between the chambers and compartments along the outer surface of the valve stem. Such seals should be located between the first chamber 40 and the second compartments 72 on the inner wall of the bonnet at aperture 58, between the first and second compartments 66 and 72 on the inside surface of the piston 56, and between the first compartment 66 and the second chamber 50 on the inner walls of the lower cap 16 and the pressure cap 52.

As noted above, the valve of FIG. 1 is in the "open" position. The piston 56 is illustrated in its "inward" position contacting a lip 76 of the cylindrical member 24. The lip 76 prevents further inward displacement of the piston and forms a metal-to-metal seal with the shoulder of the piston. The lip 76 limits the maximum stroke of the piston, valve stem and valve element. In order to aid quick closing of the valve when the operating pressure in compartment 66 is lost, the piston may include an orifice 69 which permits a relatively small leak between the compartments 66 and 72 when a metal-to-metal seal beteen the lip 76 and the shoulder of the piston is not achieved.

Figure 2:
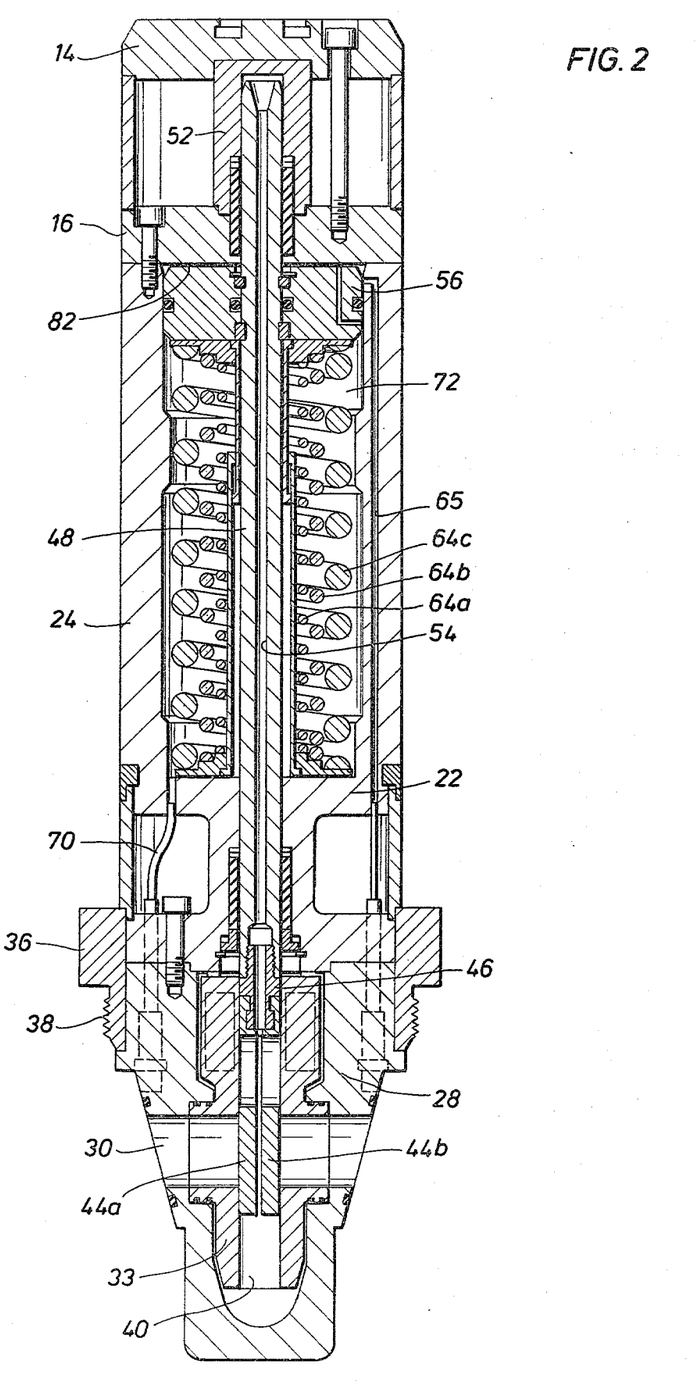
FIG. 2 is a sectional view of the valve shown in FIG. 1 wherein the valve is in the closed position to prevent fluid flow through the pipeline.

FIG. 2 is similar to FIG. 1 except that the piston 56 is in its "outward" position, contacting the bottom surface 82 of the lower cap 16. The valve stem 48, lifting lugs 46 and valve element 44 are advanced outwardly with respect to the valve body 28, closing the passageway 30.

To advance the valve element 44 across the passageway 30, hydraulic or pneumatic pressure is introduced through the conduit 65 into the first compartment 66 (see FIG. 1). When the pressure force, within the first compartment acting against the first face 68 of the piston, exceeds the compressive force of the springs 64a–c and the reservoir pressure, within the second compartment 72 acting against the second face 74 of the piston, the piston moves inward. In this manner, the valve element 44 is also advanced inward and the passageway 30 is opened.

Figure 3:
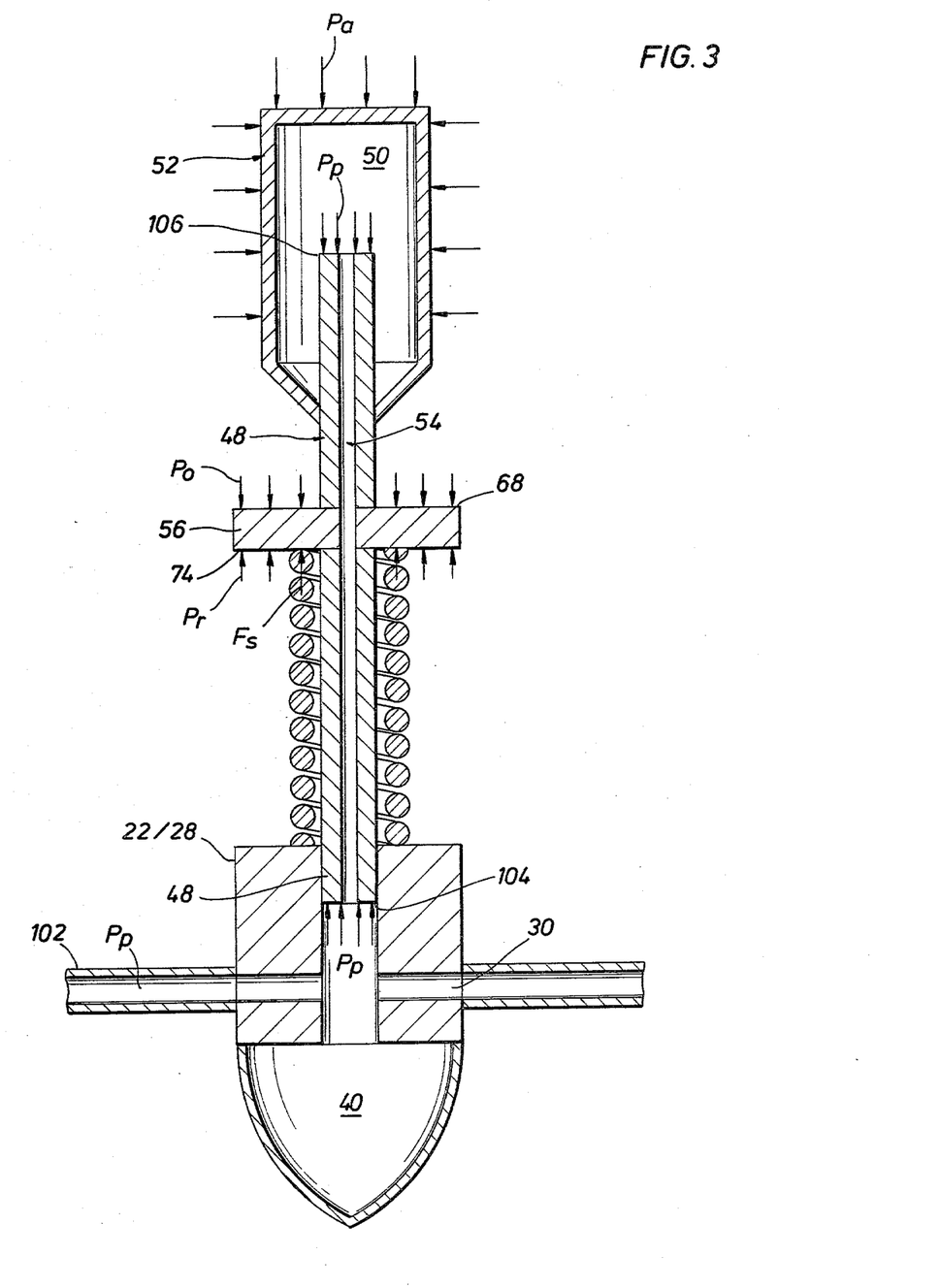
FIG. 3 is a schematic view of the moving components of the valve of the present invention illustrating the internal forces associated with the operation of the valve.

FIG. 3 is an enlarged schematic view of the major moving components of the valve except for the valve element 44 which has been removed for clarity. The hollow passageway 54 provides for the same pipeline pressure ($P_p$) to be exerted on both ends 104 and 106 of the valve stem 48. Since the second chamber 50 is isolated from the ambient hydrostatic pressure ($P_a$) and since the pipeline pressure ($P_p$) is the same on both ends of the valve stem, the force ($F_p$, not shown in FIG. 3) against both ends of the valve stem will be the same provided the cross-sectional areas of both ends of the valve stem are the same. This is the pressure balanced feature of the valve. And, as discussed above, the valve is pressure balanced even when the passageway 30 is closed because the bifurcated gate system admits pressure from the high pressure side of the passageway 30 only. The lifting lugs 46 will not prevent pressure in the first chamber from contacting the entire cross-sectional end area of the valve stem because the connection between the valve stem and lifting lugs is a loose fitting lug-in-groove connection. If the valve stem, lifting lugs and valve elements are manufactured as an integral component, as mentioned above, the geometry of the valve stem is chosen so that the cross-sectional end area of the valve stem within the first chamber is substantially the same as the cross-sectional end area of the valve stem within the second chamber.

Referring still to FIG. 3, to move the valve element 44 inward, operating pressure ($P_o$) is introduced into the first compartment 66. Once the operating force ($F_o$, not shown in FIG. 3 but resulting from the operating pressure, $P_o$, acting against the first face 68) exceeds the spring force ($F_s$) and the reservoir force ($F_r$, not shown in FIG. 3 but resulting from the reservoir pressure, $P_r$, acting against the second face 74), the piston is advanced inwardly. Thus, the valve stem and element are also advanced inwardly to open a pipeline 102 to fluid flow. Because the valve stem is protected from the ambient pressure ($P_a$) by the pressure cap 52, a large hydrostatic pressure will not influence the overall operation of the valve. Thus, the piston is displaced inward when:

$$F_o > F_s + F_r \tag{1}$$

The valve is referred to as being fail-safe because the valve closes any time the operating pressure ($P_o$) is lost. Loss of operating pressure causes the piston to advace outward due to the force of the spring which is the only unbalanced force. Any friction between the valve element 44 and valve body 28 which might dampen the biasing of the springs 64 is minimized by the friction-reducing effect of the self-sealing system 33, previously discussed.

Figure 4:
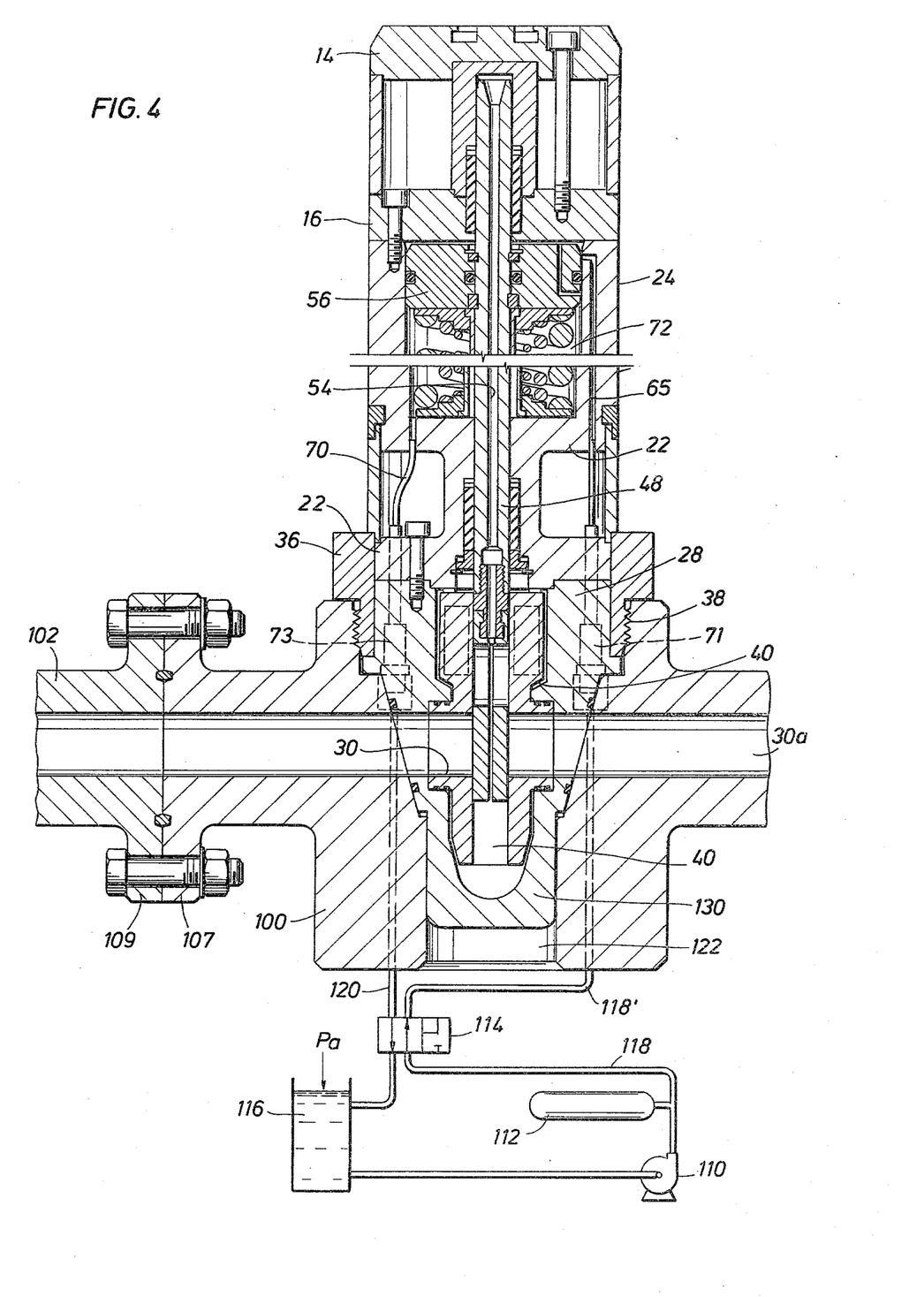
FIG. 4 is a sectional view of the valve similar to FIG. 2, but attached to the submerged pipeline.

FIG. 4 illustrates the engagement of the valve to a mounting hub 100 of the pipeline 102. FIG. 4 is substantially similar to FIG. 2 except that the valve is rotatably connected to the mounting hub by the locking ring 36 and the hydraulic operating components are also illustrated schematically.

The mounting hub 100 includes a passageway 30a which is an extension of the passageway 30 in the valve body 28 and of the interior of the pipeline 102. The mounting hub may include a flange 107 which is bolted to a matching flange 109 of the pipeline. Alternatively, the mounting hub may be an integral component of the pipeline (not shown).

FIG. 4 also illustrates the hydraulic components which could be used to operate the present invention. The operating pressure ($P_o$) is supplied by a pump 110 which charges a hydraulic accumulator 112. The accumulator maintains a pre-selected operating pressure. In normal operation, the operating pressure passes from the accumulator or pump, if the accumulator is being charged, through a conduit 118, a two-phase valve 114, a conduit 118' (which extends through the mounting hub to the quick-disconnector 71), conduit 65 and into the first compartment 66. The piston is displaced inwardly when the operating force ($F_o$) exceeds the spring force ($F_s$) plus the back-up reservoir force ($F_r$, see equation (1)).

The hydraulic system also permits the evacuation of excessive reservoir pressure within the second compartment 72. The conduit 70 (which extends from the second compartment 72 through the bonnet 22) connects with a conduit 120 by means of the quick-disconnector 73. The conduit 120 passes through the mounting hub 100 and the two-phase valve 114 to a reservoir equalizer 116. The reservoir pressure within the second compartment 72 is maintained at ambient hydrostatic pressure ($P_a$) by the reservoir equalizer 116. Since the reservoir is maintained at ambient pressure, the operating pressure must exceed the ambient pressure (not to mention the force of the springs) to displace the piston. Thus, the hydraulic system is capable of balancing ambient pressure on both sides of the piston and capable of eliminating the influence of the ambient pressure on the housing at substantially the same time. Alternatively, the reservoir equalizer 116 may be housed in a pressure vessel (not shown) and maintained at less than ambient pressure. This would then require a lesser operating pressure to displace the piston inward.

With a loss of operating pressure or other emergency, the two-phase valve 114 automatically shifts under the bias of a spring (not shown) to its other position. In this position, the operating pressure in the conduit 118 flowing from the pump 110 or the accumulator 112 is blocked. Thus, the operating pressure remaining in the first compartment 66 is exhausted through the conduit 120 along with the reservoir pressure in the second compartment 72, which is exhausted through the conduit 118', into the equalizer 116. Since the pressures in the compartments 66 and 72 are balanced, the unbalanced spring force biases the piston outward, closing the pipeline off.

The valve is capable of being remotely installed and removed by a manipulator tool. an example of such a manipulator tool is reference numeral 103 in U.S. Pat. No. 3,777,812 (see also column 4, lines 24 to 44 of U.S. Pat. No. 3,777,812).

In a normal installation, the tool grasps the valve housing and initially positions the valve body adjacent to the opening of the mounting hub 100. Since it is necessary that the correct quick-disconnectors (71 or 73) engage to properly operate the hydraulic system, a nose 130 of the valve body 28 is fabricated in a rectangular or similar cross-sectional shape so that it will fit into an open channel 122 of the mounting hub in only one or two positions. If two positions are possible, the operator of the manipulator tool would initially position the valve, once adjacent to the mounting hub, so that the correct quick-disconnectors would engage when the nose 130 of the valve body is fully extended into the channel 122. The manipulator tool would then rotate the locking ring 36 engaging the threads 38 and securably fastening the valve to the mounting hub. To remove the valve from the mounting hub, the same procedure would be performed in the reverse order.

The valve has been described in terms of a preferred embodiment. Modifications and alternations to this embodiment will be apparent to those skilled in the art in view of this disclosure. It is, therefore, intended that all such equivalent modifications and variations fall within the spirit and scope of the present invention as claimed.

What is claimed is:

1. A subsea valve apparatus insensitive to ambient hydrostatic pressure and used to control fluid flow in a pipe and capable of being remotely engageable with said pipe, which apparatus comprises:

closure means for reciprocating movement across said pipe, said closure means having a valve element capabe of moving between a first position to stop fluid flow and a second position to permit fluid flow in the pipe and a valve stem connected to said valve element and extending therefrom, said valve stem having a passageway extending therethrough providing fluid communication between opposite ends of said valve stem so that the pressure force at one end of said valve stem being introduced from said pipe is substantially the same as the pressure force at the other end of said valve stem thereby balancing the influence of the pipe pressure on both ends of said valve stem;

means for reciprocating said valve element across said pipe between the first and second positions;

means for encasing said valve element and the opposite ends of said valve stem in a waterproof manner, sheltering said valve element and the opposite ends of said valve stem from the ambient hydrostatic pressure and equalizing means capable of balancing ambient pressure within said reciprocating means to eliminate the influence of hydrostatic pressure on the operation of said valve and capable of eliminating the influence of hydrostatic pressure on said encasing means at substantially the same time.

2. The apparatus according to claim 1 wherein said encasing means comprises:

a housing attached at one end to said valve body, said housing having a hollow cylindrical member to support said valve stem.

3. The apparatus according to claim 2 wherein said reciprocating means comprises:

an annular piston positioned around said valve stem;

spring means circumscribing said valve stem and supported within said cylindrical member; and means for pressurizing against one side of said piston to advance said piston against the force of said spring means by providing a force greater than the force of said spring means thereby advancing said valve element across said pipe.

4. A subsea valve apparatus insensitive to ambient hydrostatic pressure and used to control the flow of fluid in a pipe, which apparatus comprises:

a valve body capable of being remotely engagable with said pipe and forming a first chamber;

a housing attached at one end to said valve body, said housing forming a second chamber at the other end;

a valve element supported by said valve body within said first chamber and capable of advancing across said pipe to control the flow of fluid in said pipe;

a valve stem attached to said valve element and supported within said housing, said valve stem extending from said valve element in said first chamber to said second chamber, said valve stem having a passageway extending therethrough providing fluid communication between said first and second chambers so that pressure force on one end of said valve stem being introduced from said pipe said first chamber is substantially the same as the pressure force on the opposite end of said valve stem in said second chamber thereby balancing the influence of the pipe pressure on both ends of said valve stem;

means for reciprocating said valve element across said pipe, said reciprocating means comprises:
an annular piston positioned around said valve stem,
spring means circumscribing said valve stem and supported within said cylindrical member, and
means for pressurizing against one side of said piston to advance said piston against the force of said spring means by providing a force greater than the force of said spring means thereby advancing said valve element across said pipe; and equalizing means capable of balancing ambient pressure on both sides of said piston to eliminate the influence of hydrostatic pressure on the operation of said valve and capable of eliminating the influence of hydrostatic pressure on said housing at substantially the same time.

5. The apparatus according to claim 4 wherein said housing includes a hollow cylindrical member defining an intermediate chamber between said first and second chambers and supporting said reciprocating means.

6. A subsea valve apparatus insensitive to ambient hydrostatic pressure and used to control fluid flow in a submerged pipe, which apparatus comprises:
a valve body capable of being remotely engagable with said pipe and forming a first chamber;
a housing attached at one end to said valve body and having a pressure cap supported therein at its other end, said pressure cap forming a second chamber;
a valve element supported by said valve body within said first chamber and capable of advancing across said pipe to control fluid flow in said pipe;
a valve stem attached to said valve element and supported within said housing, said valve stem extending longitudinally through said housing into said second chamber and being supported by said cap, said valve stem includes a passageway extending longitudinally therethrough to provide fluid communication between said first and second chambers so that the pressure being introduced from said pipe into said first chamber is substantially the same as the pressure in said second chamber thereby balancing the influence of the pipe pressure on both ends of said valve stem;
means for reciprocating said valve element across said pipe; and
equalizing means capable of balancing ambient pressure within said reciprocating means to eliminate the influence of hydrostatic pressure on the operation of said valve and capable of eliminating the influence of hydrostatic pressure on said housing at substantially the same time.

7. The apparatus according to claim 6 wherein said housing also includes a hollow cylindrical member between said body and said cap forming an intermediate chamber.

8. The apparatus according to claim 7 wherein said housing further includes a valve bonnet attached to said valve body and said cylindrical member separating said first chamber from said intermediate chamber.

9. The apparatus according to claim 7 wherein said reciprocating means comprises:
an annular piston having a first and second face, positioned around said valve stem within said intermediate chamber;
means for pressurizing against the first face of said piston to advance said piston, valve stem and valve element across said pipe; and
spring means circumscribing said valve stem and supported within said cylindrical member between the second face of said piston and one end of said cylindrical member to bias said valve element back across said pipe when said pressuring means loses pressure.

* * * * *

UNITED STATES PATENT AND TRADEMARK OFFICE
CERTIFICATE OF CORRECTION

PATENT NO. : 4,311,297
DATED : January 19, 1982
INVENTOR(S) : Claud C. Barrington It is certified that error appears in the above—identified patent and that said Letters Patent is hereby corrected as shown below:

Column 5, line 14, delete "are" after the word "conduits" and insert therefor--and--.

Column 7, line 40, delete "an" and insert therefor--An--.

Claim 1, column 8, line 7, delete "capabe" and insert therefor--capable--.

Claim 1, column 8, line 25, after "pressure" insert--;--.

Claim 2, column 8, line 33, after "comprises" insert the following additional element--a valve body to support said valve element, and--.

Claim 4, column 8, line 65, after "pipe" insert--into--.

Signed and Sealed this

First Day of June 1982

[SEAL]

Attest:

GERALD J. MOSSINGHOFF

*Attesting Officer*     *Commissioner of Patents and Trademarks*